United States Patent
Kizaki

(10) Patent No.: US 11,063,822 B2
(45) Date of Patent: Jul. 13, 2021

(54) ELECTRONIC APPARATUS AND CONTROL METHOD

(71) Applicant: TOSHIBA CLIENT SOLUTIONS CO., LTD., Tokyo (JP)

(72) Inventor: Shigeki Kizaki, Tokyo (JP)

(73) Assignee: Toshiba Client Solutions CO., LTD., Tokyo (JP)

(*) Notice: Subject to any disclaimer, the term of this patent is extended or adjusted under 35 U.S.C. 154(b) by 261 days.

(21) Appl. No.: 16/233,010

(22) Filed: Dec. 26, 2018

(65) Prior Publication Data

US 2020/0067764 A1 Feb. 27, 2020

(30) Foreign Application Priority Data

Aug. 27, 2018 (JP) .............................. JP2018-158396

(51) Int. Cl.
| G06F 9/4401 | (2018.01) |
| H04L 12/24 | (2006.01) |
| G06F 9/445 | (2018.01) |
| G06F 8/65 | (2018.01) |

(52) U.S. Cl.
CPC .............. *H04L 41/082* (2013.01); *G06F 8/65* (2013.01); *G06F 9/4411* (2013.01); *H04L 41/20* (2013.01)

(58) Field of Classification Search
CPC ............... H04L 41/082; H04L 41/0813; H04L 41/0806; H04L 41/0823; G06F 9/44505; G06F 9/4418; G06F 8/70
See application file for complete search history.

(56) References Cited

U.S. PATENT DOCUMENTS

| 2013/0234850 A1* | 9/2013 | Lee ...................... H04B 10/114 340/539.12 |
| 2016/0080888 A1* | 3/2016 | Kreitzer .................. G06F 3/017 455/39 |
| 2016/0277891 A1* | 9/2016 | Dvortsov ................ H04W 4/12 |
| 2017/0262015 A1 | 9/2017 | Li et al. |
| 2017/0359684 A1* | 12/2017 | Leclerc ................. H04W 76/14 |
| 2018/0254948 A1* | 9/2018 | Li ......................... H04W 76/14 |
| 2019/0369402 A1* | 12/2019 | Woodman ............ G02B 27/017 |
| 2020/0113513 A1* | 4/2020 | Hirano ................... A61B 5/024 |
| 2020/0279269 A1* | 9/2020 | Wagner .............. G06Q 20/3226 |

FOREIGN PATENT DOCUMENTS

| JP | 2006-208687 A | 8/2006 |
| JP | 2016-119544 A | 6/2016 |
| JP | 2018-505577 A | 2/2018 |
| WO | WO 2017/018370 A1 | 2/2017 |

* cited by examiner

*Primary Examiner* — Diane L Lo
*Assistant Examiner* — Abusayeed M Haque
(74) *Attorney, Agent, or Firm* — Knobbe, Martens, Olson & Bear, LLP

(57) ABSTRACT

According to one embodiment, an electronic apparatus includes a transceiver and a processor. The transceiver is connectable to any of a plurality of wearable devices wearable by a user. The processor updates a configuration file that stores one or more configuration values of the plurality of wearable devices. The processor provides, when a first wearable device of the plurality of wearable devices is connected to the electronic apparatus, the one or more configuration values to the first wearable device. The processor provides, when a second wearable device of the plurality of wearable devices is connected to the electronic apparatus, the one or more configuration values to the second wearable device.

13 Claims, 12 Drawing Sheets

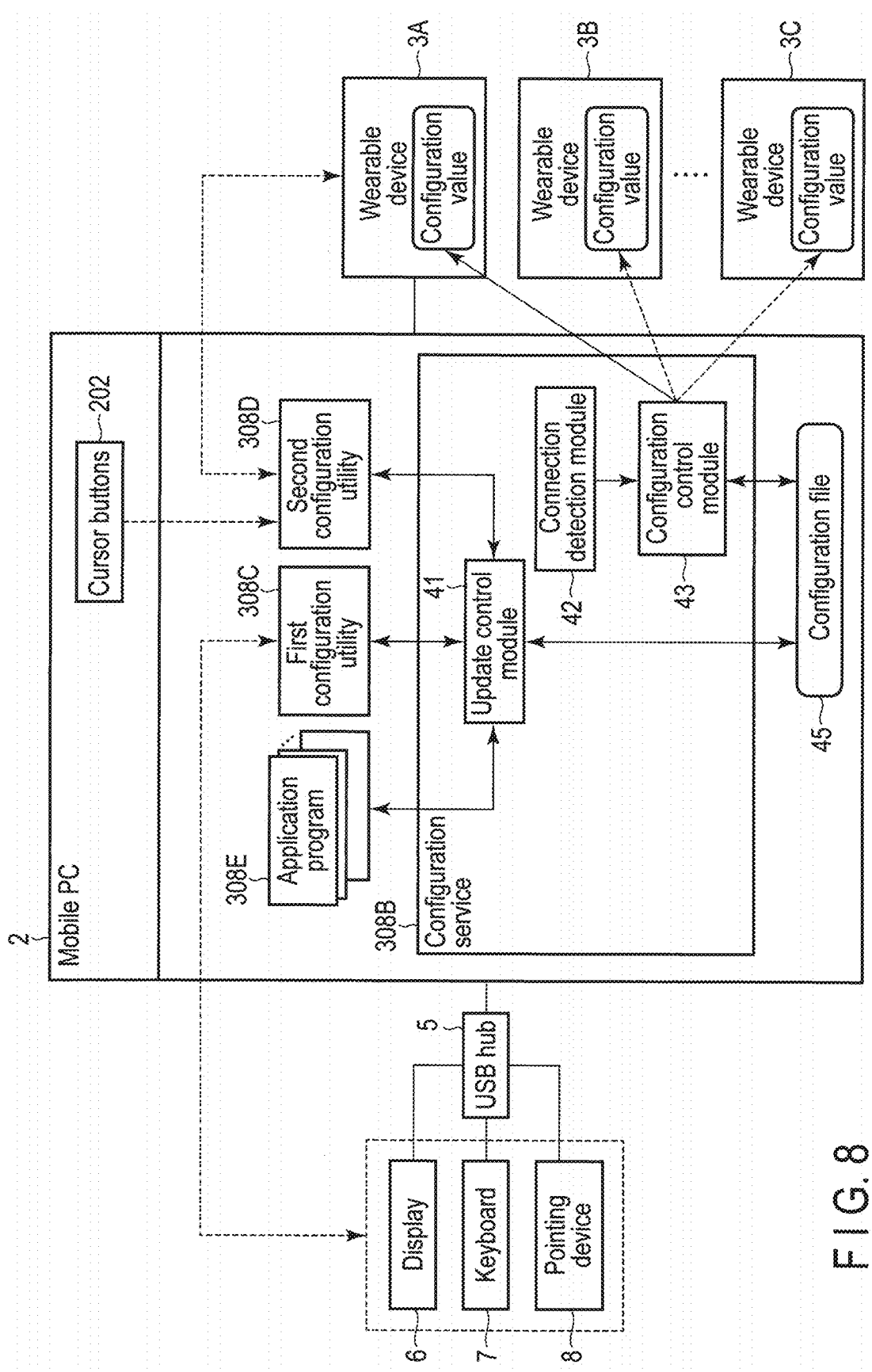
F I G. 8

| Target | Parameter | Possible configuration values | Initial value | Current value |
|---|---|---|---|---|
| Display | Brightness auto-adjustment | On / Off | On | On |
| Display | Brightness | 0-255 | 70 | 100 |
| Display | Orientation auto-adjustment | On / Off | Off | On |
| Display | Orientation | Left / Right | Right | Right |
| Touchpad | Touchpad | On / Off | On | On |
| Touchpad | Vertical direction flip | On / Off | Off | Off |
| Touchpad | Horizontal direction flip | On / Off | Off | Off |
| Button | Current profile | 0-7 | 0 | 0 |
| Button | First button short key code | USB HID key codes | 114 | 114 |
| Button | Second button short key code | USB HID key codes | 40 | 40 |
| Button | Third button short key code | USB HID key codes | 112 | 112 |
| Button | Fourth button short key code | USB HID key codes | 108 | 108 |
| Button | First button long key code | USB HID key codes | 114 | 114 |
| Button | Second button long key code | USB HID key codes | 41 | 41 |
| Button | Third button long key code | USB HID key codes | 112 | 112 |
| Button | Fourth long key code | USB HID key codes | 104 | 104 |
| Flashlight | LED light auto-adjustment | On / Off | On | Off |
| Audio | Audio mode | Voice call / Live recording / Personal recording | Live recording | Live recording |

F I G. 9

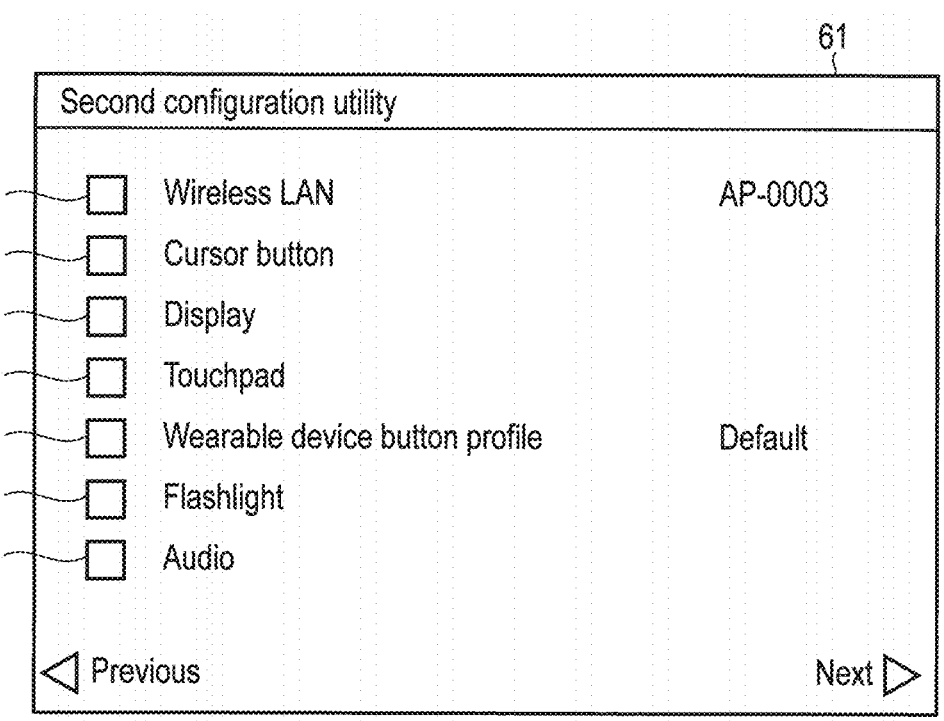
F I G. 11

ELECTRONIC APPARATUS AND CONTROL METHOD

CROSS-REFERENCE TO RELATED APPLICATIONS

This application is based upon and claims the benefit of priority from Japanese Patent Application No. 2018-158396, filed Aug. 27, 2018, the entire contents of which are incorporated herein by reference.

FIELD

Embodiments described herein relate generally to an electronic apparatus and a control method of the electronic apparatus.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device (MECD) having high degrees of versatility and processing capacity, and can be used by an operator (user) on site, is needed separately from a data center (or cloud). Thereby, it is expected that promotion of the operational efficiency and productivity improvement at a workplace and the like, or load dispersion of data and improvement in a network environment and the like, will be achieved.

Mobile devices such as MECD may be used with any wearable device such as an eyeglass-type equipment and a bracelet-type equipment. The mobile device and the wearable device mutually transmit and receive data, so that the mobile device can process data generated by, for example, a camera or a sensor provided in the wearable device.

The wearable device operates based on configurations (also referred to as environment settings). A user may change the configurations by an operation to the wearable device or an operation to a mobile device to which the wearable device is connected. Information related to the configurations of the wearable device is, for example, stored in the wearable device.

The information related to the configurations may be stored in a volatile memory. In that case, the information will be lost when power to the wearable device is shut off.

Furthermore, there is a case where a wearable device is connected to a mobile device and then another wearable device is connected to the mobile device. In that case, if these wearable devices are products of the same type, and if a user wants to use these wearable devices in the same configurations, the user must perform operations of configurations for each of these wearable devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 8 is a block diagram showing an example of the functional configuration of the electronic apparatus of the embodiment.

FIG. 9 shows a configuration example of a configuration file used by the electronic apparatus of the embodiment.

FIG. 11 shows an example of a screen image of a second configuration utility displayed by the electronic apparatus of the embodiment.

DETAILED DESCRIPTION

Figure 1:
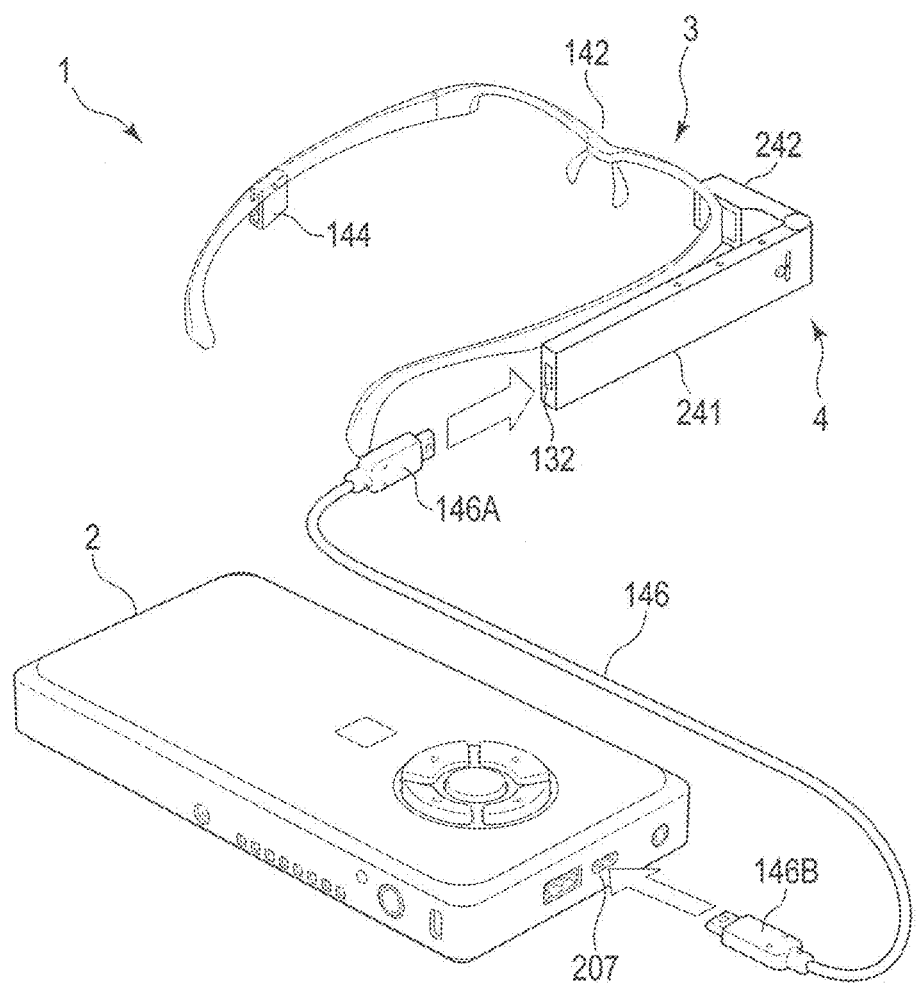
FIG. 1 is a perspective view of an example of an external appearance of an electronic apparatus (mobile PC) according to an embodiment and a main body of a wearable device connected to the electronic apparatus.

Various embodiments will be described hereinafter with reference to the accompanying drawings.

In general, according to one embodiment, an electronic apparatus includes a transceiver and a processor. The transceiver is connectable to any of a plurality of wearable devices wearable by a user. The processor updates a configuration file that stores one or more configuration values of the plurality of wearable devices. The processor provides, when a first wearable device of the plurality of wearable devices is connected to the electronic apparatus, the one or more configuration values to the first wearable device. The processor provides, when a second wearable device of the plurality of wearable devices is connected to the electronic apparatus, the one or more configuration values to the second wearable device.

Hereinafter, embodiments will be described with reference to the drawings. Note that the disclosure is merely an example, and the invention is not limited by the content described in the following embodiments. Naturally, the modifications easily conceivable by those skilled in the art are included in the scope of the disclosure. In order to make the description clearer, there are cases where the size, shape, etc., of each part in the drawings are schematically represented by changing them relative to the actual embodiment. In a plurality of drawings, corresponding elements are denoted by the same reference numerals, and a detailed explanation may be omitted.

[Control System]

First, referring to FIG. 1, a configuration of a control system 1 including an electronic apparatus according to an embodiment will be described. This electronic apparatus is a portable wireless device that can be implemented as a mobile personal computer (PC) including a mobile edge computing device (MECD), or a mobile information terminal such as a smartphone, a mobile phone, a PDA, and the like. Hereinafter, a case where this electronic apparatus is realized as a mobile PC 2 will be exemplified.

The control system 1 includes the mobile PC 2 and a wearable device 3. The user carries the mobile PC 2 and wears the wearable device 3. The wearable device 3 can be worn on a user's body (for example, the arm, the neck, the head, etc.). As the wearable device 3, a wearable device of a glass-type, a bracelet-type, a wristwatch-type, a headphone-type, or the like can be used. In the following, it is assumed that the wearable device 3 is a glass-type wearable device.

The wearable device 3 includes an eyeglass frame 142 and a wearable device main body 4. The eyeglass frame 142 may have a shape obtained by removing a lens from general eyeglasses, and is mounted on the face of an operator. The eyeglass frame 142 may have a structure to which eyeglasses are attached. In a case where an operator regularly uses eyeglasses, lenses having the same power as those of regularly used eyeglasses may be attached to the eyeglass frame 142. The wearable device main body 4 is constituted of a side part 241 to be along the temple of the eyeglass frame 142, and a front part 242 to be positioned on the line of sight of one eyeball of the operator. The angle which the front part 242 forms with the side part 241 is adjustable.

The mobile PC 2 and the wearable device 3 establish a wired connection or a wireless connection to communicate. In the example shown in FIG. 1, the mobile PC 2 and the wearable device 3 are connected by a cable 146. This cable 146 is, for example, a cable conforming to USB type-C (registered trademark) standard. The mobile PC 2 may communicate with the wearable device 3 by various wireless communication methods such as wireless LAN or Bluetooth (registered trademark).

As shown in FIG. 1, at the rear end of the side part 241 of the wearable device main body 4, a USB Type-C standard receptacle 132 to which a plug 146A at one end of the cable 146 is to be inserted is provided. A plug 146B at the other end of the cable 146 is inserted into a receptacle 207 conforming to USB Type-C standard provided on the upper end face of the mobile PC 2. As described above, the wearable device main body 4 is connected to the mobile PC 2 through the USB type-C cable 146, and various signals are transmitted from/to the wearable device main body 4 to/from the mobile PC 2. The plugs and receptacles may be replaced with each other in accordance with the design or the like, and they may be referred to as connector. The wearable device main body 4 may also be connected to the mobile PC 16 by means of wireless communication such as a wireless LAN, Bluetooth, and the like.

In the embodiment, the wearable device main body 4 is not provided with a battery or DC terminal serving as a drive power supply, and the drive power is supplied from the mobile PC 2 to the wearable device main body 4 through the USB type-C cable 146. However, the wearable device main body 24 may also be provided with a drive power supply.

The operator may always use a particular mobile PC 2 or may use one of mobile PCs 2. That is, the operator may pick up a new one from the mobile PCs 2 at each operation occasion. Furthermore, for example, one wearable device 3 is connected to the mobile PC 2 used by the operator in each time. The wearable device 3 to be connected to the mobile PC 2 may be different at each time. The wearable devices 3 that may be connected to the mobile PC 2 may be devices of same type or devices having the same functions.

The number of mobile PCs 2 and the number of wearable devices 3 that constitute the control system 1 used by operators may have a relationship of 1 to N or N to N where N is an integer of one or more.

[Mobile PC 2]

Figure 2:
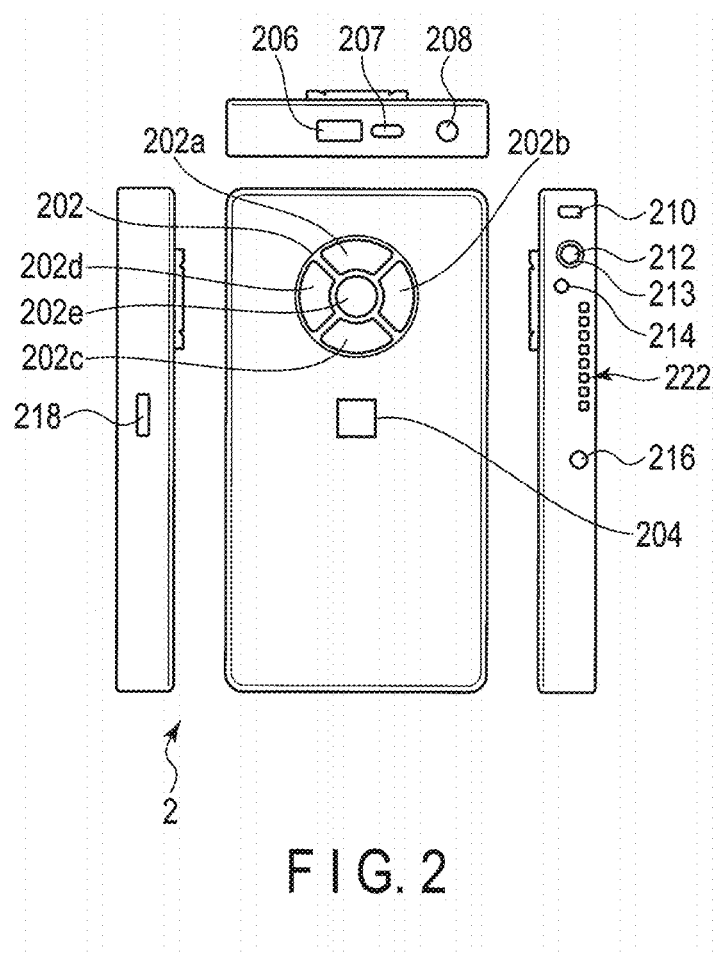
FIG. 2 shows the external appearance of a front surface, side surfaces, and an upper surface of the electronic apparatus of the embodiment.

FIG. 2 shows an example of an external appearance of the mobile PC (mobile edge computing device) 2. The mobile PC 2 is a small-sized PC that can be held by one hand, and has a small size and light weight, i.e., a width thereof is about 10 cm or less, height thereof is about 18 cm or less, thickness thereof is about 2 cm, and weight thereof is about 300 g. Accordingly, the mobile PC 2 can be held in a pocket of the work clothing of the operator, holster to be attached to a belt, or a shoulder case, and is wearable. Although the mobile PC 2 incorporates therein semiconductor chips such as the CPU, semiconductor memory, and the like, and storage devices such as a Solid State Disk (SSD), and the like, the mobile PC 2 is not provided with a display device and hardware keyboard for input of characters.

On the front surface of the mobile PC 2, cursor buttons 202 constituted of an up button 202*a*, right button 202*b*, down button 202*c*, left button 202*d*, and decision button 202*e* (also called a center button or enter button) are arranged, and fingerprint sensor 204 is arranged below the cursor buttons 202. The mobile PC 2 is not provided with a hardware keyboard for input of characters, and a password number (also called a PIN) cannot be input. Therefore, the fingerprint sensor 204 is used for user authentication at the time of login of the mobile PC 2. A command can be input from the cursor buttons 202.

The operation procedures of the cursor buttons 202 are determined by programs.

For example, when the decision button 202*e* is pressed once, item selection/item execution is carried out, when the decision button 202*e* is pressed for a long time, ending or cancellation of an operation is carried out, when the up button 202*a* is pressed once, the cursor is moved upward, when the up button 202*a* is pressed for a long time, a list of application programs being executed is displayed, when the down button 202*c* is pressed once, the cursor is moved downward, when the down button 202*c* is pressed for a long time, a menu of quick settings is displayed, when the left button 202*d* is pressed once, the right icon is selected, and when the right button 202*b* is pressed once, the left icon is selected.

On the upper side face of the mobile PC 2, a USB 3.0 receptacle 206, a USB type-C receptacle 207, and an audio jack 208 are provided.

On one side face (e.g., side face on the left side when viewed from the front) of the mobile PC 2, a memory card slot 218 for a memory card is provided. The memory card includes, for example, an SD card, micro SD card (registered trademark), and the like.

On the other side face (e.g., side face on the right side when viewed from the front) of the mobile PC 2, a slot 210 for Kensington Lock (registered trademark), power switch 212, power LED 213, DC IN/battery LED 214, DC terminal 216, and ventilation holes 222 for cooling are provided. The power LED 213 is arranged around the power switch 212, and is turned on while the mobile PC 2 is being powered on. The DC IN/battery LED 214 indicates the state of the mobile PC 2 such as whether the battery is being charged, and remaining battery level. Although the mobile PC 2 may be driven by the battery, the mobile PC 2 can also be driven in the state where the AC adaptor is connected to the DC terminal 216. Although not shown, the back side of the mobile PC 2 is configured such that the battery can be replaced with a new one by a one-touch operation.

Figure 3:
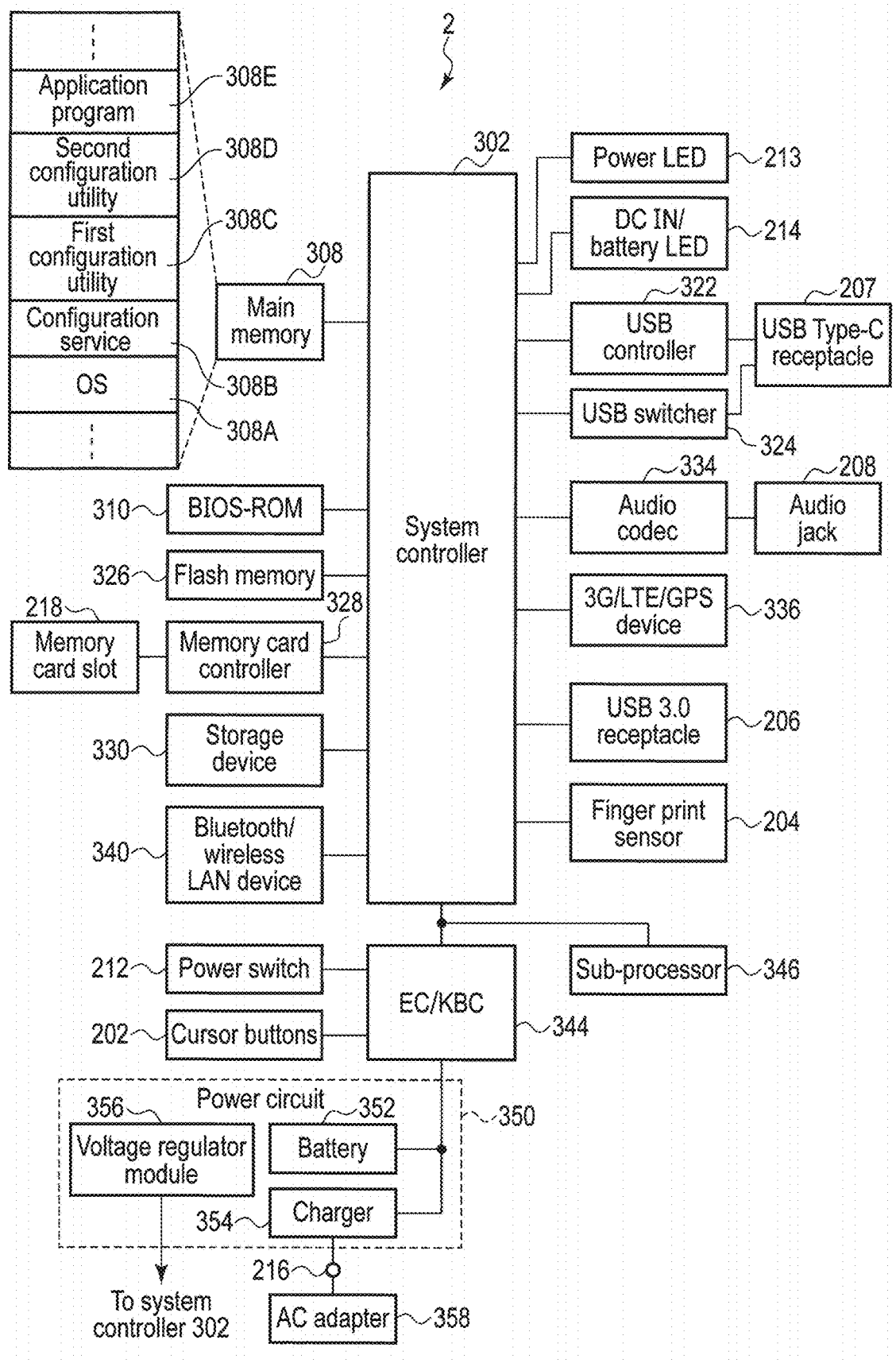
FIG. 3 is a block diagram showing an example of the system configuration of the electronic apparatus of the embodiment.

FIG. 3 shows an example of the system configuration of the mobile PC 2. The mobile PC 2 includes a system controller 302. The system controller 302 includes a processor (CPU) and a controller hub. A main memory 308, a BIOS-ROM 310, the power LED 213, the DC IN/battery 214, and a USB controller 322 are connected to the processor. A flash memory 326, a memory card controller 328, a storage device 330 including an HDD or an SSD, a USB switch 324, an audio codec 334, a 3G/LTE/GPS device 336, the finger print sensor 204, a USB 3.0 receptacle 206, a Bluetooth/wireless LAN device 340, and an EC/KBC 344 are connected to the controller hub.

The system controller 302 executes various programs loaded from the storage device 330 into the main memory 308. The system controller 302 controls the operation of each component in the mobile PC 2 by executing the instructions included in the programs.

The programs include an OS 308A, a configuration service 308B, a first configuration utility 308C, a second configuration utility 308D, and various application programs 308E. The configuration service 308B is a program to provide a function to manage configurations (that is, environment settings) of the mobile PC 2 and the wearable device 3, and a function to apply the configurations to each of the mobile PC 2 and the wearable device 3.

The first configuration utility 308C is a utility program to confirm and change the configurations by a user (for example, administrator) with input/output devices such as display, keyboard, pointing device connected to the mobile PC 2. The second configuration utility 308D is a utility program to confirm and change the configurations by a user (for example, operator, worker, etc.) with the wearable device 3 connected to the mobile PC 2. A user uses at least one of the first configuration utility 308C and the second configuration utility 308D in accordance with the operation environment of the user, for example.

The application programs 308E include programs related to the operation of the wearable device 3. The application program 308E is used for voice conversation, video streaming, image sharing, and the like. When executing each program, a change to the configurations of the wearable device 3 may be necessary.

The first configuration utility 308C, second configuration utility 308D, and various application programs 308E may request the configuration service 308B to change the configurations. The configuration service 308B changes the configurations in accordance with the request, and provides the changed configurations to at least one of the mobile PC 2 and the wearable device 3.

The audio codec 334 converts a digital audio signal to be played into an analog audio signal and supplies the converted analog signal to the audio jack 208. Further, the audio codec 334 converts an analog audio signal input from the audio jack 208 into a digital signal.

The memory card controller 328 accesses a memory card (for example, an SD card) inserted into the memory card slot 218, and controls reading/writing of data from/to the memory card.

The USB controller 322 controls transmission and reception of data with respect to a USB Type-C cable including a plug that is connected to the USB Type-C receptacle 207 or a USB 3.0 cable (not shown) including a plug that is connected to the USB 3.0 receptacle 206. A type of interface that is not provided in the mobile PC 2, such as USB, HDMI (registered trademark) and the like can be used by connecting a USB hub and a port extension adapter to the USB Type-C receptacle 207.

The Bluetooth/wireless LAN device 340 executes wireless communication conforming to the Bluetooth/IEEE802.11 standard for the purpose of connection to the network. For the connection to the network, not only wireless communication but also wired LAN communication conforming to the IEEE802.3 standard may be used.

The fingerprint sensor 204 is used for fingerprint authentication at the time of boot or reboot of the mobile PC 2.

A sub-processor 346, the power switch 212, and the cursor buttons 202 are connected to the EC/KBC 344. The EC/KBC 344 has a function of turning on or turning off the power to the mobile PC 2 in response to the operation of the power switch 212. The control of power-on and power-off is executed by the cooperative operation of the EC/KBC 344 and power circuit 350. Even during a power-off period of the mobile PC 2, the EC/KBC 344 operates by the power from a battery 352 or AC adaptor 358 connected as an external power supply. The power circuit 350 uses the power from the battery 352 or AC adaptor 358 to thereby control power to be supplied to each component. The power circuit 350 includes a voltage regulator module 356. The voltage regulator module 356 is connected to the processor in the system controller 302.

Although the mobile PC 2 is constituted as a body separate from the wearable device main body 4, the mobile PC 2 may be incorporated into the wearable device main body 4, and both of them may also be integrated into one body.

[Wearable Device 3]

An example of the external appearance of the wearable device 3 connected to the mobile PC 2 will be explained with reference to FIGS. 4 and 5. As described above, the wearable device 3 includes the eyeglass frame 142 and the wearable device main body 4.

The eyeglass frame 142 is provided with mounting brackets 144 on both the right and left temples thereof. The wearable device main body 24 is attached to and detached from one of the mounting brackets 144 on the right or left temple. In FIG. 4, the mounting bracket 144 on the temple on the right side of the operator is hidden behind the wearable device main body 4, and hence is not shown. As described above, the wearable device main body 4 is provided with a display device 124. The display device 124 is configured in such a way as to be viewed by one eye. Therefore, the mounting brackets 144 are provided on both the right and left temples so that the wearable device main body 4 can be attached to the mounting bracket on the dominant eye side. The wearable device main body 4 need not be detachably attached to the eyeglass frame 142 by means of the mounting bracket 144. The wearable devices 3 for the right eye and left eye in which the wearable device main bodies 4 are respectively fixed to the eyeglass frames 142 on the right and left frames may be prepared. Furthermore, the wearable device main body 4 may not be attached to the eyeglass frame 142, but may be attached to the head of the operator by using a helmet or goggle.

An engaging piece 128 (shown in FIG. 4) of the wearable device main body 4 is forced between upper and lower frames of the mounting bracket 144, whereby the wearable device main body 4 is attached to the eyeglass frame 142.

When the wearable device main body 4 is to be detached from the eyeglass frame 142, the wearable device main body 4 is plucked out of the mounting bracket 144.

In a state where the wearable device main body 4 is attached to the mounting bracket 144, the engaging piece 128 is somewhat movable backward and forward in the mounting bracket 144. Accordingly, the wearable device main body 4 is adjustable in the front-back direction so that the operator's eye can be brought to a focus on the display device 124.

Furthermore, the mounting bracket 144 is rotatable around an axis 144A perpendicular to the temple. After the wearable device main body 4 is attached to the eyeglass frame 142, the wearable device main body 4 is adjustable in the vertical direction so that the display device 124 can be positioned on the operator's line of sight. Moreover, the rotational angle of the mounting bracket 144 is about 90 degrees and, by largely rotating the mounting bracket 144 in the upward direction, the wearable device main body 4 can be flipped up from the eyeglass frame 142. Thereby, even when it is difficult to watch the real thing because the field of view is obstructed by the wearable device main body 4 or even when the wearable device main body 4 interferes with surrounding objects in a small space, it is possible to temporarily divert/restore the wearable device main body 4 from/to the field of view of the operator without detaching/reattaching the entire wearable device 3 from/to the face of the operator.

[Wearable Device Main Body 4]

As described above, the wearable device main body 4 is constituted of the side part 241 to be along the temple of the eyeglass frame 142, and the front part 242 to be positioned on the line of sight of one eyeball of the operator. The angle which the front part 242 forms with the side part is adjustable.

Figure 4:
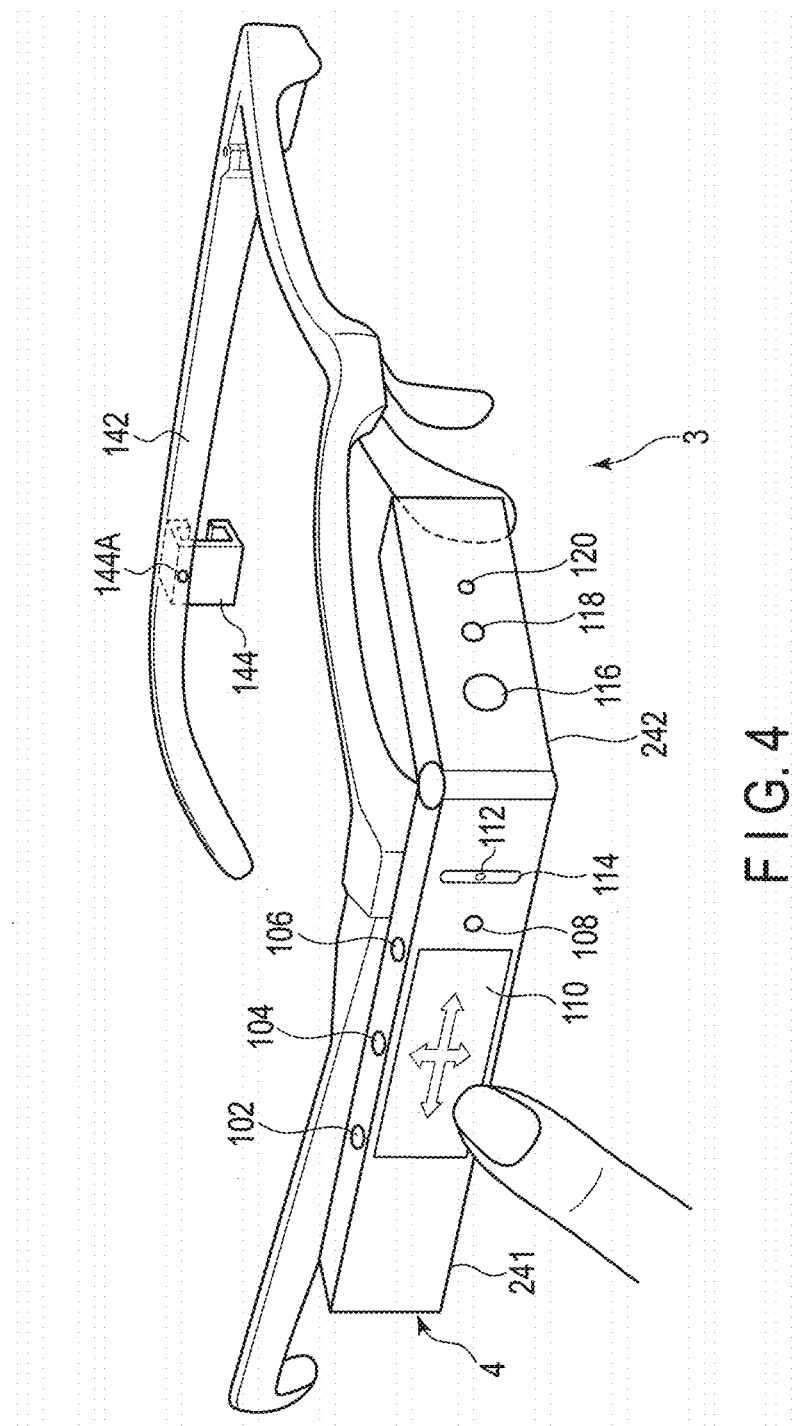
FIG. 4 is a perspective view showing an example of the external appearance of the wearable device of FIG. 1.

As shown in FIG. 4, on the outside surface of the front part 242, a camera 116, a light 118, and a camera LED 120 are provided. The light 118 is an auxiliary lighting fixture emitting light at the time of shooting a dark object. The camera LED 120 is configured to be turned on at the time of shooting a photograph or video to thereby cause the objective person to be photographed to recognize that he or she is to be photographed.

On the top surface of the side part 241 of the wearable device main body 4 attached to the right side temple, first, second, and third buttons 102, 104, and 106 are provided. When the dominant eye of the operator is the left eye, the wearable device main body 4 is attached to the left side temple. The top and the bottom of the wearable device main body 4 are reversed according to whether the wearable device main body 4 is attached to the right side temple or to the left side temple. Therefore, the first, second, and third buttons 102, 104, and 106 may be provided on both the top surface and undersurface of the side part 241.

On the outside surface of the side part 241, a touchpad 110, fourth button 108, microphone 112, and illuminance sensor 114 are provided. The touchpad 110 and fourth button 108 can be operated by a forefinger. When the wearable device main body 4 is attached to the right side temple, the buttons 102, 104, and 106 are arranged at positions at which the buttons 102, 104, and 106 can be operated by a forefinger, middle finger, and third finger, respectively. The touchpad 110 is configured such that the movement of finger in up and down directions or back and forth directions on the surface on the touchpad 110 as indicated by arrows can be detected. The movement to be detected includes flicking of a finger for grazing the surface quickly in addition to dragging of a finger for moving the finger with the finger kept in contact with the surface. Upon detection of up-and-down or back-and-force movement of the operator's finger, the touchpad 110 inputs a command. In this description, a command implies an executive instruction to execute specific processing to be issued to the wearable device main body 4. Operation procedures for the first to fourth buttons 102, 104, 106, and 108, and touchpad 110 are determined in advance by the programs.

For example, when the third button 106 is pressed once, item selection/item execution is carried out (corresponding to pressing once of the decision button 202e in the mobile PC 2), when the third button 106 is pressed for a long time, a list of application programs being executed is displayed (corresponding to pressing the up button 202a for a long time in the mobile PC 2), when the second button 104 is pressed once, the screen returns to a home screen, when the second button 104 is pressed for a long time, a menu of quick settings is displayed (corresponding to pressing the down button 202c for a long time in the mobile PC 2), and when the first button 102 is pressed once, cancelation of operation (corresponding to pressing once of the decision button 202e in the mobile PC 2 or operation identical to the operation of the Esc key of keyboard) is executed.

Regarding the operation of the touchpad 110, for example, when the touchpad 110 is dragged up and down, the cursor is moved up and down, when the touchpad 110 is flicked forward (to the front of the head), the left icon is selected (continuously scrolled) (corresponding to pressing once of the right button 202b in the mobile PC 2), when the touchpad 110 is flicked backward (to the back of the head), the right icon is selected (continuously scrolled) (corresponding to pressing once of the left button 202d in the mobile PC 2), when the touchpad 110 is dragged forward, the left icon is selected (items are scrolled one by one) (corresponding to pressing once of the right button 202b in the mobile PC 2), and when the touchpad 110 is dragged backward, the right icon is selected (items are scrolled one by one) (corresponding to pressing once of the left button 202d in the mobile PC 2).

The first button 102, second button 104, third button 106, and fourth button 108 are arranged to be operated by a forefinger, a middle finger, a third finger, and a little finger, respectively. The reason why the fourth button 108 is provided not on the top surface of the side part 241, but on the outside surface of the side part 241 is that there is space restriction. The fourth button 108 may also be provided on the top surface of the side part 241 in the same manner as the first to third buttons 102, 104, and 106.

The operations performed with the buttons 102, 104, 106, and 108 and touchpad 110 of the wearable device main body 4 can be performed similarly with the cursor buttons 202 provided with the mobile PC 2. Since operators cannot view the operation of the buttons 102, 104, 106, and 108 and the touchpad 110 of the wearable device main body 4, some operators may require a time to get used to perform intentional operation. Furthermore, the buttons 102, 104, 106, and 108 and the touchpad 110 are small and may be difficult to operate. In the present embodiment, the same operations can be performed with the cursor buttons 202 of the mobile PC 2, and thus, the above problems can be solved.

The illuminance sensor 114 detects the illuminance of the surrounding area in order to automatically adjust the brightness of the display device. The sensor controller 162 (shown in FIG. 6) and the display controller 170 (shown in FIG. 6) have a brightness auto-adjustment function to automatically adjust the brightness of display 124 based on the illuminance detected by the illuminance sensor 114. The sensor controller 162 and the camera controller 168 (shown in FIG. 6) has an LED auto-adjustment function to automatically switch on or off of the flashlight 118 based on the illuminance detected by the illuminance sensor 114.

Figure 5:
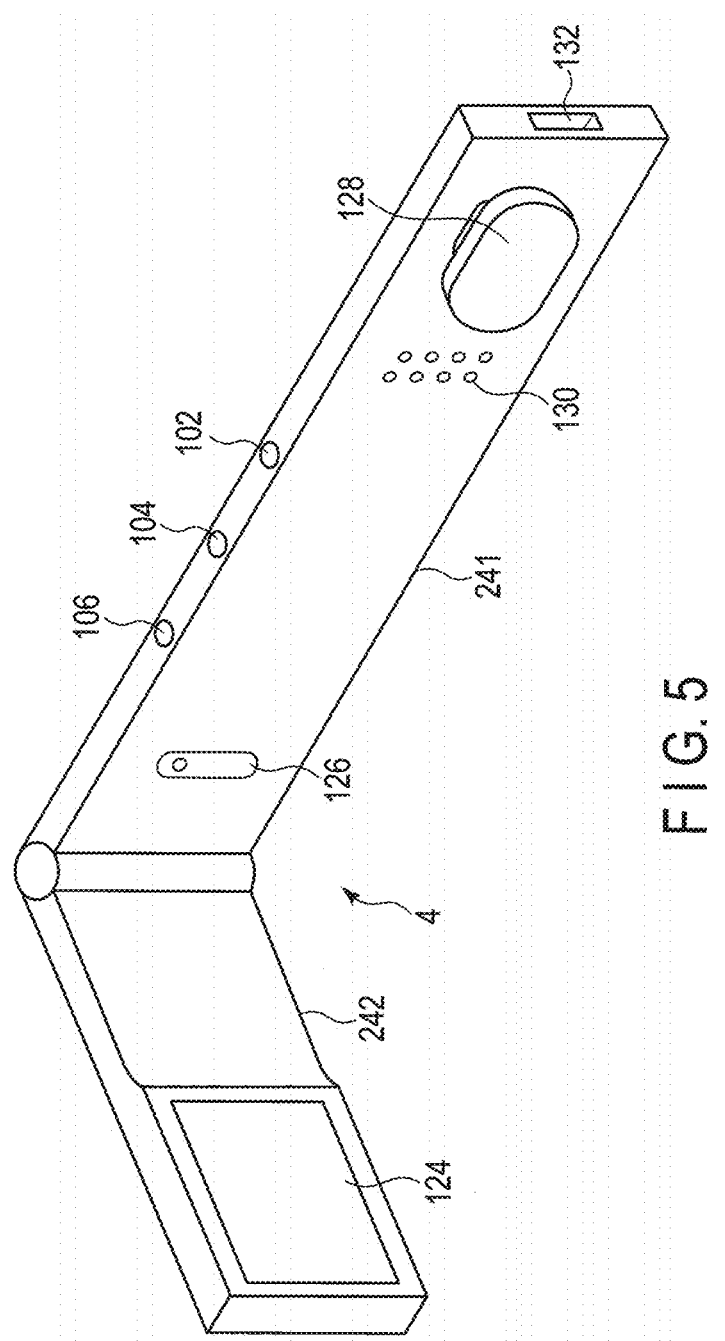
FIG. 5 is a perspective view of an example of the external appearance of the main body of the wearable device of FIG. 1.

FIG. 5 shows an example of an external appearance of the back side of the wearable device main body 4. On the inner side of the front part 242, a display device 124 constituted of an LCD is provided. On the inner side of the side part 241, a microphone 126, speaker 130, and engaging piece 128 are provided. The microphone 126 is provided at a front position of the side part 241, and speaker 130 and engaging piece 128 are provided at a rear position of the side part. Headphones may be used in place of the speaker 130. In this case, the microphone and headphones may also be provided in an integrated manner as a headset.

Figure 6:
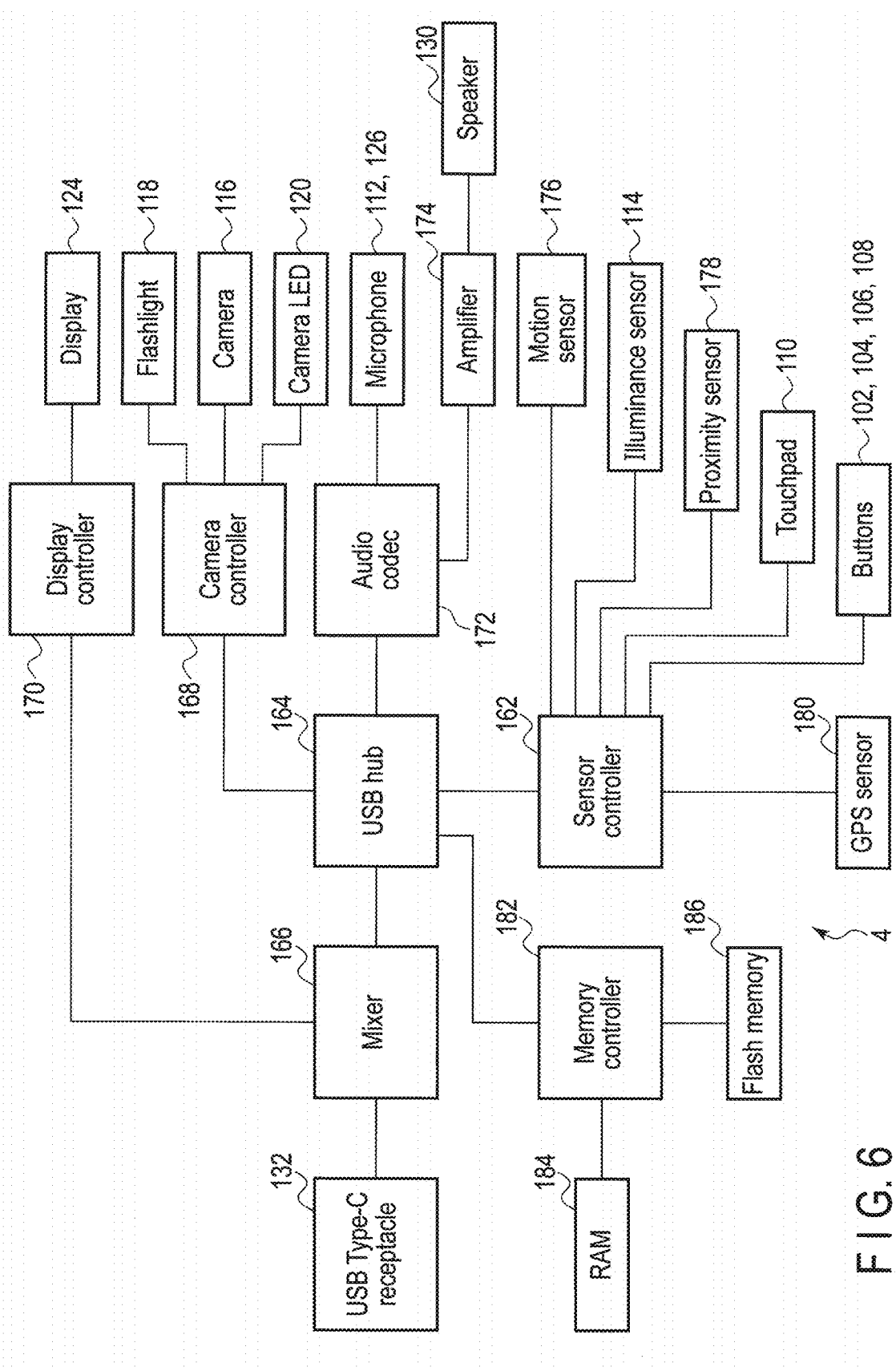
FIG. 6 is a block diagram showing an example of the system configuration of the main body of the wearable device of FIG. 1.

FIG. 6 shows an example of the system configuration of the wearable device main body 4. The USB type-C receptacle 132 is connected to a mixer 166. The display controller 170 and USB hub 164 are respectively connected to a first terminal and second terminal of the mixer 166. The display device 124 is connected to the display controller 170. The camera controller 168, an audio codec 172, and the sensor controller 162 are connected to the USB hub 164. The camera 116, flashlight 118, and camera LED 120 are connected to the camera controller 168. Audio signals from the microphones 112 and 126 are input to the audio codec 172, and audio signal from the audio codec 172 is input to the speaker 130 through an amplifier 174.

A motion sensor (for example, acceleration, geomagnetism, gravitation, gyroscopic sensor, etc.) 176, the illuminance sensor 114, a proximity sensor 178, the touchpad 110, the first to fourth buttons 102, 104, 106, and 108, and a GPS sensor 180 are connected to the sensor controller 162. The sensor controller 162 processes signals generated by the motion sensor 176, illuminance sensor 114, proximity sensor 178, touchpad 110, first to fourth buttons 102, 104, 106, and 108, and GPS sensor 180, and supplies a command to the mobile PC 16. Although not shown in FIG. 5, the motion sensor 176 and proximity sensor 178 are arranged inside the wearable device main body 4.

The motion sensor 176 detects movement, orientation, posture, and the like of the wearable device main body 4. The sensor controller 162 and the display controller 170 have an orientation auto-adjustment function to automatically adjust the orientation of the screen image displayed on the display 124 based on the movement, orientation, posture, and the like detected by the motion sensor 176.

The proximity sensor 178 detects attachment of the wearable device 3 based on approach of a face, finger and the like of the operator thereto.

The memory controller 182 controls reading and writing of data with respect to RAM 184 that is a volatile memory. Furthermore, the memory controller 182 controls reading and writing of data with respect to a flash memory 186 that is a nonvolatile memory. One or more configuration values to control operation of each component in the wearable device 3 are stored in at least one of the RAM 184 and the flash memory 186. Each component of the wearable device 3 is operated based on the one or more configuration values stored in the RAM 184 and the flash memory 186.

The configuration values include values of parameters related to, for example, the display 124, the touchpad 110, the buttons 102, 104, 106, and 108, the flashlight 118, the microphones 112 and 126, and the speaker 130. The parameters related to the display 124 include, for example, on or off of brightness auto-adjustment function, brightness, on or off of orientation auto-adjustment function, and orientation. The parameters related to the touchpad 110 include, for example, on or off of the touchpad 110, on or off of flip in vertical direction, and on or off of flip in horizontal direction. The parameters related to the buttons 102, 104, 106, and 108 include, for example, key codes generated in response to pressing of each button. The parameters related to the flashlight 118 include, for example, on or off of LED auto-adjustment function. The parameters related to the microphones 112 and 126 and the speaker 130 include, for example, audio modes. The configuration values may further include values of parameters related to various components in the wearable device 3 (for example, the camera 116, the camera LED 120, the amplifier 174, and various sensors 114, 176, 178, and 180).

Each configuration value stored in the RAM 184 and the flash memory 186 is updated in accordance with a signal to change the configuration value sent from the mobile PC 2. The configuration values stored in the RAM 184 are lost by the boot or reboot of the mobile PC 2. If the wearable device main body 4 includes a drive power source, the configuration values stored in the RAM 184 are lost when the wearable device main body 4 is turned off.

Note that, instead of the RAM 184 and the flash memory 186, at least one of a volatile memory and a nonvolatile memory may be installed into each of the sensor controller 162, the camera controller 168, the display controller 170, and the audio codec 172. In that case, the configuration values related to these components 162, 168, 170, and 172 may be stored in each installed memory.

Figure 7:
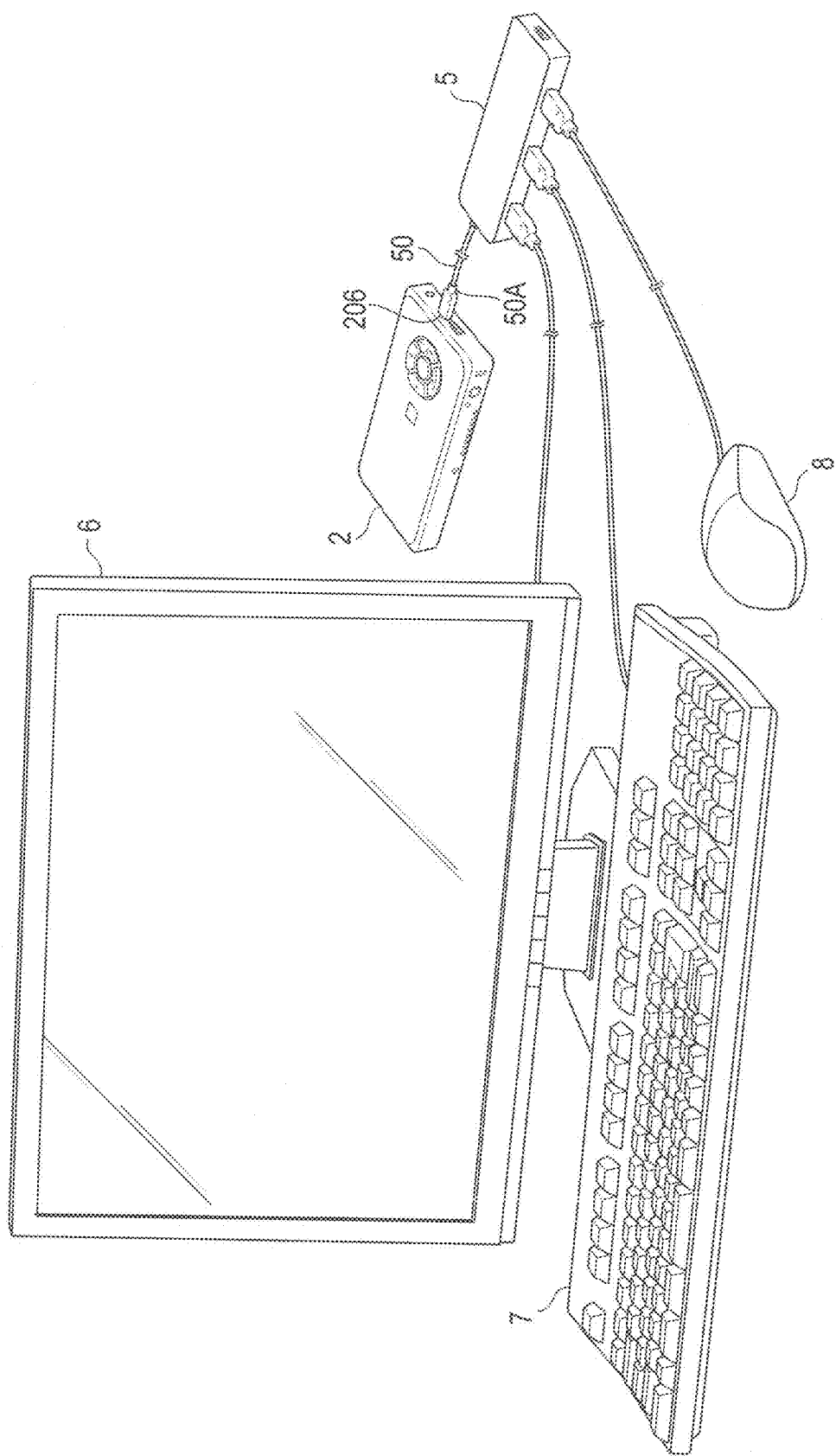
FIG. 7 shows an example where input/output devices are connected to the electronic apparatus of the embodiment via a USB hub.

FIG. 7 shows an example where input/output devices are connected to the mobile PC 2 via the USB hub 5. As described above, the USB 3.0 receptacle 206 is provided with the upper side surface of the mobile PC 2. A plug 50A at one end of USB 3.0 cable 50 provided with the USB hub 5 is inserted into the USB 3.0 receptacle 206. The USB hub 5 includes multiple USB 3.0 receptacles. Thus, when the plug 50A is inserted into the USB 3.0 receptacle 206 of the mobile PC 2, various input/output devices can be connected to the mobile PC 2 via the USB hub 5. The input/output devices are, for example, a display 6, a keyboard 7, and a pointing device 8 (for example, mouse).

The display 6 receives image signals sent from the mobile PC 2 via the USB hub 5 and displays a screen image based on the image signals. The keyboard 7 sends a signal corresponding to an operation by a user (for example, a code corresponding to a key pressed by the user) to the mobile PC 2 via the USB hub 5. The pointing device 8 sends a signal corresponding to an operation by a user (for example, data indicative of a button pressed by the user, and/or coordinate data indicative of a position instructed by the user) to the mobile PC 2 via the USB hub 5.

The display 6 displays, for example, a screen image including GUI to confirm and change the configurations of the mobile PC 2 and the wearable device 3 when the first configuration utility 308C is executed on the mobile PC 2. The keyboard 7 and the pointing device 8 may be used for operating the GUI.

FIG. 8 shows an example of the functional configuration of the mobile PC 2. The mobile PC 2 includes, for example, an update control module 41, a connection detection module 42, and a configuration control module 43. These modules 41, 42, and 43 are realized by the system controller 302 (processor) of the mobile PC 2 executing instructions included in the configuration service 308B and controlling the operation of each component indicated as the system configuration of the mobile PC 2. The system configuration of the mobile PC 2 is described above with reference to FIG. 3.

The update control module 41 updates a configuration file (also referred to as an environment setting file) 45 in cooperation with the first configuration utility 308C, the second configuration utility 308D, and the application programs 308E. The first configuration utility 308C, second configuration utility 308D, and application programs 308E may use API to operate in cooperation with the update control module 41 (configuration service 308B). The first configuration utility 308C, the second configuration utility 308D, and the application programs 308E use API to request the update control module 41 to acquire current configuration values and to update configuration values, for example.

The configuration file 45 stores one or more configuration values related to the configurations of the wearable device 3. The configuration values are used to control the operation of one or more components provided in each of one or more wearable devices 3 that may be connected to the mobile PC 2. The one or more components may include any of the components of the wearable device 3 explained above with reference to FIG. 6.

The configuration values that may be acquired or changed by the first configuration utility 308C, the second configuration utility 308D and the application programs 308E, are managed by a single configuration file 45. The configuration file 45 may be used as a master of the configuration values to provide the same configuration to the wearable devices 3A, 3B, and 3C. Thus, upon connection of any of the wearable devices 3A, 3B, and 3C to the mobile PC 2, the configuration values indicated in the configuration file 45 are provided to the connected wearable device 3A, 3B, or 3C. Thus, any of the wearable devices 3A, 3B, and 3C can be operated with the single configurations.

The configuration file 45 is stored in the nonvolatile memory such as a storage device 330 or a flash memory 326. Note that the configuration file 45 may be stored in a server to which the mobile PC 2 is connected via the network. In that case, the update control module 41 may acquire the configuration file 45 from the server via the network and update the configuration file 45 stored in the server via the network, for example.

Now, operation of each component at the time when the acquisition and change of the configuration values are requested by the first configuration utility 308C, the second configuration utility 308D, or the application program 308E will be specifically explained.

Firstly, the update control module 41 provides configuration values indicated in the configuration file 45 when the first configuration utility 308C, the second configuration utility 308D, or the application program 308E is started.

By using the provided configuration values, the first configuration utility 308C displays GUI for a user (for example, administrator) to confirm and change the configurations on the display 6 connected to the mobile PC 2. The user may perform an operation to change any of the configuration values to the GUI using an input device such as the keyboard 7 or the pointing device 8. The first configuration utility 308C requests the update control module 41 to change the configuration values in accordance with the operation by the user.

Similarly, by using the provided configuration values, the second configuration utility 308D displays GUI for a user (for example, operator, worker, etc.) to confirm and change the configurations on the display 124 of the wearable device 3. The user may perform an operation to change any of the configuration values to the GUI using the cursor buttons 202 or the like. The second configuration utility 308D requests the update control module 41 to change the configuration values in accordance with the operation by the user.

Furthermore, the application program 308E is, for example, an application program for voice conversation, image streaming, screen sharing, and the like. The application program 308E that has been started requests, when the configuration values provided by the configuration service 308B are not suitable for the function provided by the application program 308E, the update control module 41 to change the configuration value (or values). The application program 308E may request the update control module 41 to change the configuration value (or values) in accordance with a user's operation using the configuration menu or the like provided with the application program 308E.

The update control module 41 receives a request related to a change of the configuration value (or values) from each of the first configuration utility 308C, the second configuration utility 308D, and the application program 308E. The request includes, for example, information indicative of the configuration value after the change. The update control module 41 updates the configuration file 45 in accordance with the request. Note that, the wearable device 3 may not be connected to the mobile PC 2 while the operation to change the configuration value is performed and the process to update the configuration file 45 is executed. The configuration file 45 can be updated regardless of whether or not the wearable device 3 is connected to the mobile PC 2.

FIG. 9 shows a configuration example of the configuration file 45. The configuration file 45 includes records corresponding to configuration values. Each record includes respective fields of a target, a parameter, possible configuration values, an initial value, and a current value.

In a record corresponding to a configuration value, the target field shows an element in the wearable device 3 that operates based on the configuration value. The target field may show an element corresponding to a component in the wearable device 3, or an element corresponding to multiple components in the wearable device 3. The element is, for example, "display", "touchpad", "button", "flashlight", "audio", or the like. The "display", "touchpad", "button", and "flashlight" indicate the display 124, the touchpad 110, the buttons 102, 104, 106, and 108, and the flashlight 118, respectively, as the components in the wearable device 3. Furthermore, the "audio" indicates at least one of the microphones 112 and 126 and the speaker 130.

The parameter field shows a configuration parameter to which the configuration value is set. Values set to the target field and the parameter field specify in what configuration a certain configuration value of the wearable device 3 is used.

The field of possible configuration values shows values or a range of values that can be set as the corresponding configuration value. The initial value field shows a value initially set as the configuration value. The current value field shows a value to be currently set as the configuration value. The value shown in the current value field is provided to the configuration value stored in the wearable device 3 to control the operation of the wearable device 3.

Values set to the target filed, the parameter field, the field of possible configuration values, and the initial value field may be preliminarily defined by an administrator or the like.

On the other hand, the value set in the current value field may be changed in accordance with a request of change by any one of the first configuration utility 308C, the second configuration utility 308D, and the application program 308E.

In the following description, a specific example of the configuration file 45 shown in FIG. 9 will be explained.

In the four records each including the target field to which "display" is set, the parameter fields of the four records show "brightness auto-adjustment", "brightness", "orientation auto-adjustment", and "orientation", respectively.

The "brightness auto-adjustment" is a parameter to turn on or off the brightness auto-adjustment function to automatically change the brightness of the display 124. In the corresponding record, the field of possible configuration values shows "on" and "off". This record also includes the initial value field showing "on" and the current value field showing "on".

The "brightness" is a parameter to set the brightness of the display 124. In the corresponding record, the field of possible configuration values shows 0 to 255. This record also includes the initial value field showing "70" and the current value field showing "100".

The "orientation auto-adjustment" is a parameter to turn on or off the orientation auto-adjustment function to automatically change the orientation of screen image displayed on the display 124. In the corresponding record, the field of possible configuration values shows "on" and "off". This record also includes the initial value field showing "off" and the current value field showing "on".

The "orientation" is a parameter to set the orientation of the screen image displayed on the display 124. In the corresponding record, the field of possible configuration values shows "left" and "right". This record also includes the initial value field showing "right" and the current value field showing "right".

In the three records each including the target field to which "touchpad" is set, the parameter fields of the three records show "touchpad", "vertical direction flip", and "horizontal direction flip", respectively.

The "touchpad" is a parameter to turn on or off the input using the touchpad 110. In the corresponding record, the field of possible configuration values shows "on" and "off". This record also includes the initial value field showing "on" and the current value field showing "on".

The "vertical direction flip" is a parameter to turn on or off the input by flipping in which a finger is vertically slid on the touchpad 110. In the corresponding record, the field of possible configuration values shows "on" and "off". This record also includes the initial value field showing "off" and the current value field showing "off".

The "horizontal direction flip" is a parameter to turn on or off the input by flipping in which a finger is horizontally slid on the touchpad 110. In the corresponding record, the field of possible configuration values shows "on" and "off". This record also includes the initial value field showing "off" and the current value field showing "off".

In the nine records each including the target field to which "button" is set, the parameter fields of the nine records show "current profile", "first button short key code", "second button short key code", "third button short key code", "fourth button short key code", "first button long key code", "second button long key code", "third button long key code", and "fourth button long key code", respectively.

The "current profile" is a parameter to set the profile of the first to fourth buttons 102, 104, 106, and 108. In the corresponding record, the field of possible configuration values shows 0 to 7. This record also includes the initial value field showing "0" and the current value field showing "0".

The "first button short key code" is a parameter to set a key code generated when the first button 102 is pressed for less than a threshold value. In the corresponding record, the field of possible configuration value shows USB HID key codes (that is, values defined as USB HID key codes). This record also includes the initial value field showing "114" and the current value field showing "114".

The "first button long key code" is a parameter to set a key code generated when the first button 102 is pressed for the threshold value or more. In the corresponding record, the field of possible configuration values shows USB HID key codes. This record also includes the initial value field showing "114" and the current value field showing "114".

Similarly, each of the records that include parameter fields showing "second button short key code", "third button short key code", "fourth button short key code", "first button long key code", "second button long key code", "third button long key code", and "fourth button long key code", respectively, shows setting related to a key code generated when the second button 104, the third button 106, or the fourth button 108 is pressed.

In the record including the target field to which "flashlight" is set, the parameter field of the record shows "LED light auto-adjustment". The "LED light auto-adjustment" is a parameter to turn on or off an auto-flash function (that is, LED light auto-adjustment function) based on illuminance and the like by the flashlight 118. In the corresponding record, the field of possible configuration values shows "on" and "off". This record also includes the initial value field showing "on" and the current value field showing "off".

In the record including the target field in which "audio" is set, the parameter field of the record shows "audio mode". The "audio mode" is a parameter to set a mode of the microphones 112 and 126, and the speaker 130. In the corresponding record, the field of possible configuration values shows "voice call", "live recording", and "personal recording". This record also includes the initial value field showing "live recording" and the current value field showing "live recording".

The update control module 41 changes, when a change of a configuration value is requested by the first configuration utility 308C, the second configuration utility 308D, or the application program 308E, the value indicated in the current value field of the corresponding record in the configuration file 45 to the requested value. Each request from the first configuration utility 308C, the second configuration utility 308D, and the application program 308E includes information corresponding to target, parameter and current value fields, for example.

The connection detection module 42 may detect that the wearable device 3 is connected to the mobile PC 2 and that the wearable device 3 is disconnected from the mobile PC 2. Thus, the connection detection module 42 can determine whether the wearable device 3 is in connection.

Wearable devices 3A, 3B, and 3C of the same type or wearable devices 3A, 3B, and 3C having the same function (or functions) may be connected to the mobile PC 2. The wearable devices 3A, 3B, and 3C having the same function are devices which are operated similarly based on a certain configuration value.

The configuration control module 43 provides the configuration values, which are indicated in the configuration file 45, to the wearable device 3 connected to the mobile PC 2. Examples of timing when the configuration values indicated in the configuration file 45 are provided to the wearable device 3 will listed below. Note that, in any case, the configuration service 308B is executed on the mobile PC 2.

(1) when the mobile PC 2 is booted or rebooted while the wearable device 3 is connected to the mobile PC 2;

(2) when the mobile PC 2 transitions to a sleep or a suspend (or hibernation) state and then returns from the state while the wearable device 3 is connected to the mobile PC 2;

(3) when the configuration file 45 is updated in the mobile PC 2 in operation while the wearable device 3 is connected to the mobile PC 2;

(4) when the wearable device 3 is newly connected to the mobile PC 2 in operation; and (5) when the wearable device 3 is connected to the mobile PC in a sleep or a suspend state and then the mobile PC 2 returns from the state.

At each timing of (1)~(5), the configuration values indicated in the configuration file 45 are provided to the wearable device 3, and thus, the following advantages can be achieved.

In the cases of (1) and (2), even if the configuration values stored in the volatile memory of the wearable device 3 is lost because the mobile PC 2 is turned off or is in a sleep or a suspend state (that is, power supplied from the mobile PC 2 to the wearable device 3 is shut off), or because the mobile PC 2 is rebooted, the configuration values indicated in the configuration file 45 stored in the mobile PC 2 can be provided to the wearable device 3. Thus, a user can use the wearable device 3 with the same configuration as used before the mobile PC 2 is turned off, is rebooted, or transitions to a sleep or a suspend state.

In the case of (3), the configuration values indicated in the configuration file 45 updated in the mobile PC 2 can be immediately provided to the wearable device 3 in connection.

In the case of (4), the configuration values indicated in the configuration file 45 can be immediately provided to the wearable device 3 newly connected to the mobile PC 2 in operation.

In the case of (5), the configuration values indicated in the configuration file 45 can be immediately provided to the wearable device 3 newly connected to the mobile PC 2 in a sleep or a suspend state after the mobile PC 2 returns from that state.

Furthermore, in the cases of (1), (4), and (5), a new wearable device 3 which has not been connected to the mobile PC 2, or a second wearable device 3 which is different from a first wearable device 3 connected immediately before the connection of the second wearable device 3 may be connected to the mobile PC 2. In each of the new wearable device 3 and the second wearable device 3, configuration values of initial condition or configuration values set in the connection to a different mobile PC 2 may be stored. The mobile PC 2 can provide the configuration values, which are indicated in the configuration file 45, to such wearable devices 3.

The configuration file 45 may be a file to be used for the configurations of a different wearable device 3 which had been connected before. Thus, the mobile PC 2 uses the configuration file 45 stored in the mobile PC 2 such that wearable devices 3 to be connected to the mobile PC 2 are operated in the same configurations. Since a user does not perform an operation for configurations of the wearable device 3 at each time when the wearable device 3 is connected, a workload by the user to set the configurations can be reduced.

Specifically, the configuration control module 43 uses the configuration file 45 including the configurations of FIG. 9 to perform the configurations of the wearable device 3. That is, the mobile PC 2 is operated such that the configuration values indicated in the configuration file 45 are provided to the configuration values stored in the wearable device 3. For example, the configuration control module 43 sends signals indicative of each configuration value indicated in the configuration file 45 to the wearable device 3 connected thereto. The wearable device 3 receives the signals sent from the configuration control module 43, and updates the corresponding configuration value stored in the wearable device 3 with the configuration value indicated by the signals.

A certain wearable device 3A may be always connected to the mobile PC 2, or any one of wearable devices 3A, 3B, and 3C may be connected to the mobile PC 2 at each occasion. The configuration control module 43 can provide the configuration values, which are indicated in the configuration file 45, to the wearable device 3A, 3B, or 3C connected to the mobile PC 2.

Furthermore, the mobile PC 2 may be shared by multiple users. In that case, an individual configuration file 45 is created in the mobile PC 2 for each user account. Thus, in the mobile PC 2, configuration files 45 associated with user accounts, respectively, may be created.

The configuration control module 43 uses a configuration file 45 associated with a user account of a user currently using the mobile PC 2 to provide the configuration values, which are indicated in the configuration file 45, to the wearable device 3 connected to the mobile PC 2.

For example, when a first user uses the mobile PC 2 and a first wearable device 3A is connected to the mobile PC 2, the configuration control module 43 provides the configuration values, which are included in a first configuration file 45 associated with the first user, to the first wearable device 3A. When the first user uses the mobile PC 2 and a second wearable device 3B is connected to the mobile PC 2, the configuration control module 43 provides the configuration values, which are included in the first configuration file 45, to the second wearable device 3B.

Furthermore, when a second user uses the mobile PC 2 and the first wearable device 3A is connected to the mobile PC 2, the configuration control module 43 provides the configuration values, which are included in a second configuration file 45 associated with the second user, to the first wearable device 3A. When the second user uses the mobile PC 2 and the second wearable device 3B is connected to the mobile PC 2, the configuration control module 43 provides the configuration values, which are included in the second configuration file 45, to the second wearable device 3B.

As above, whichever wearable device of the wearable devices 3A, 3B, and 3C is connected to the mobile PC 2, each user can use the connected wearable device in the configurations customized for the user.

Figure 10:
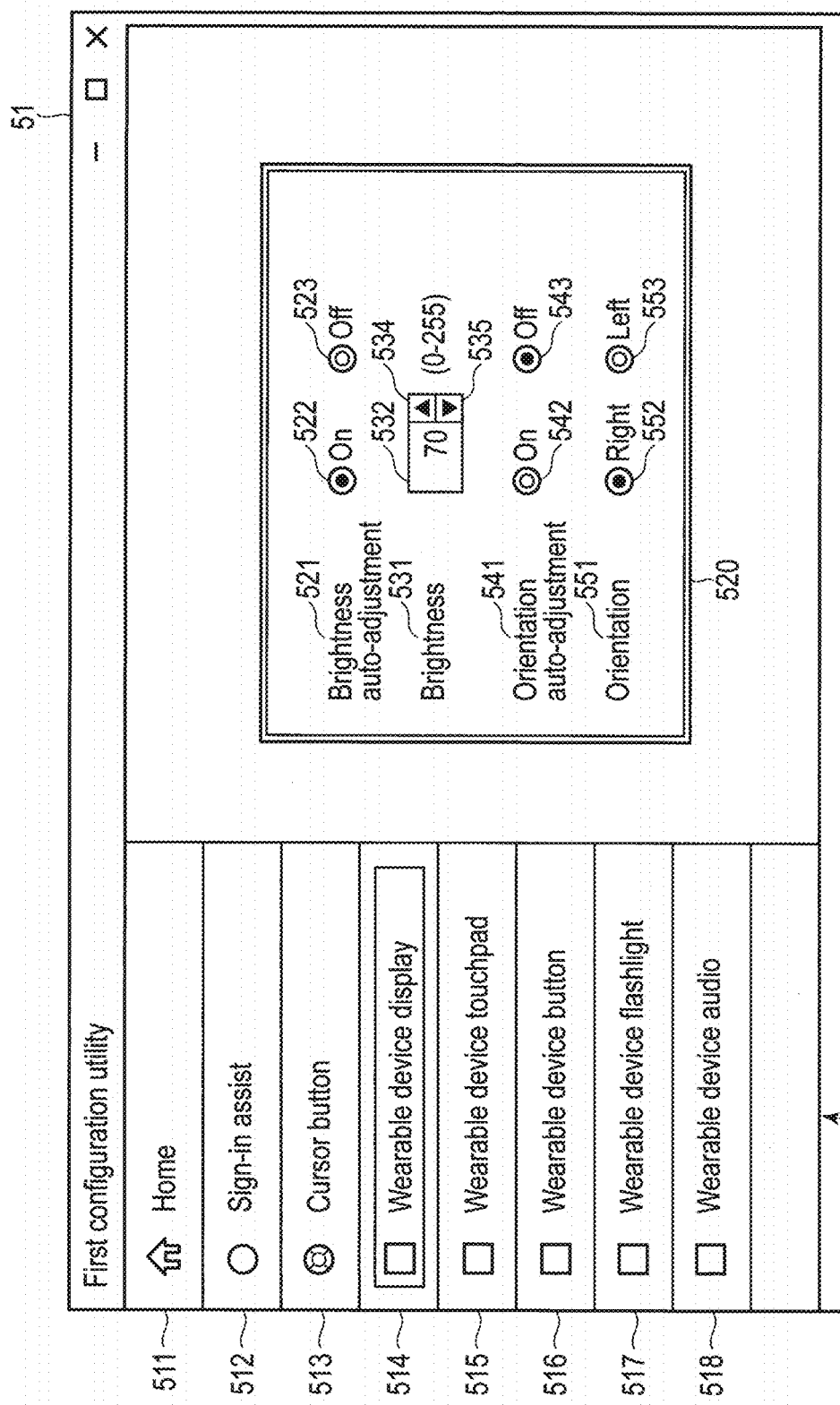
FIG. 10 shows an example of a screen image of a first configuration utility displayed by the electronic apparatus of the embodiment.

FIG. 10 shows an example of a screen image 51 displayed on the display 6 by the first configuration utility 308C. The screen image 51 is displayed as, for example, a window with GUI on the screen of the display 6. The screen image 51 includes a first area 510 in which targets of the configurations are shown and a second area 520 in which configuration values related to one of the targets are shown.

A first area 510 includes a home button 511 and buttons 510 to 518. The home button 511 is used for returning to the home screen. The buttons 510 to 518 indicate targets of the configurations, respectively. The targets of the configurations may include the components of the mobile PC 2 in addition to the components of the wearable device 3. In the example of FIG. 10, a "sign-in assist" button 512 and a "cursor button" button 513 indicate components of the mobile PC 2, and other buttons 514 to 518 indicate components of the wearable device 3.

GUI depicted in the second area 520 is switched in response to an operation to select one of the buttons 512 to 518 (for example, click operation using the pointing device 8). The GUI is used to edit the configuration values related to the target indicated by one of the buttons 512 to 518 selected by the user. For example, when the "wearable device display" button 514 is selected, as shown in FIG. 10, objects to edit four configuration values related to the display 124 is depicted in the second area 520.

The four configuration values related to the display 124 include, for example, brightness auto-adjustment, brightness, orientation auto-adjustment, and orientation. The following objects are shown in the second area 520 such that the user can edit the four configuration values.

(1-1) Text 521 showing "Brightness auto-adjustment"

(1-2) Radio button 522 to turn on the brightness auto-adjustment function and radio button 523 to turn off the brightness auto-adjustment function (either the radio button 522 or the radio button 523 is in a selected state at a time)

(2-1) Text 531 showing "Brightness"

(2-2) Input area 532 to input a value of the brightness (a text indicative of a range of possible configuration values may be depicted in the proximity)

(2-3) Button 534 to increase the value shown in the input area 532 and button 535 to decrease the value shown in the input area 532

(3-1) Text 541 showing "Orientation auto-adjustment"

(3-2) Radio button 542 to turn on the orientation auto-adjustment function and radio button 543 to turn off the orientation auto-adjustment function (4-1) Text 551 showing "Orientation"

(4-2) Radio button 552 to set the orientation to right and radio button 553 to set the orientation to left Through the operation using the keyboard 7 and the pointing device 8 on the screen image 51, a user can select one of the buttons 512 to 518 in the first area 510 corresponding to the target of configurations to be edited, and can edit the configuration values related to the selected target in the second area 520.

Upon changing of a certain configuration value, for example, the first configuration utility 308C requests the update control module 41 in the configuration service 308B to change the value. Alternatively, when a button to request update (which is not shown) has been selected or the first configuration utility 308C ends, the first configuration utility 308C may request the update control module 41 to change one or more configuration values.

FIG. 11 shows an example of a screen image 61 displayed on the display 124 of the wearable device 3 by the second configuration utility 308D.

The screen image 61 includes buttons 611 to 617 that indicate targets of configurations, respectively. The targets of configurations may include the components of the mobile PC 2 in addition to the components of the wearable device 3. In the example of FIG. 11, a "wireless LAN" button 611 and a "cursor button" button 612 indicate the components of the mobile PC 2, and the other buttons 613 to 617 indicate the components of the wearable device 3.

In response to operations for selecting one of the buttons 611 to 617 (for example, selection operations using the cursor button 202, the first to fourth buttons 102, 104, 106, and 108, and/or the touchpad 110), the screen image 61 is changed to a next screen image. The next screen image includes the same objects as in the second area 520 of FIG. 10, for example, and thus, the configuration values related to a target corresponding to one of the buttons 611 to 617 selected by the user can be edited.

Thus, by the operation using the cursor button 202 or the like on the screen image 61, a user can select one of the buttons 611 to 617 indicative of a target of configurations to be edited, and can edit the configuration values related to the selected target in the next screen image.

As described above, the screen image 61 may be displayed on the display 124 of the wearable device 3. Thus, the number of objects such as buttons 611 to 617 in the screen image 61 is less than the number of objects in the screen image 51 displayed on the display 6 shown in FIG. 10 such that the objects in the screen image 61 can be easily selected by the cursor buttons 202 alone. That is, in the screen image 61 displayed on the display 124 of the wearable device 3, the objects to be included at once are narrowed down than the objects in the screen image 51 displayed on the display 6. Furthermore, the objects such as buttons 611 to 617 in the screen image 61 may be arranged to be intuitionally selected by the user using the cursor buttons 202a, 202b, 202c, and 202d indicating the vertical and horizontal directions (for example, the buttons 611 to 617 are aligned in the vertical direction or in the horizontal direction). Thus, the user can easily perform the operation using the cursor buttons 202 and the like on the screen image 61.

Upon changing of a certain configuration value, for example, the second configuration utility 308D requests the update control module 41 in the configuration service 308B to change the value. Alternatively, when a button to request update (which is not shown) has been selected, or when the second configuration utility 308D ends, the second configuration utility 308D may request the update control module 41 to change one or more configuration values.

Figure 12:
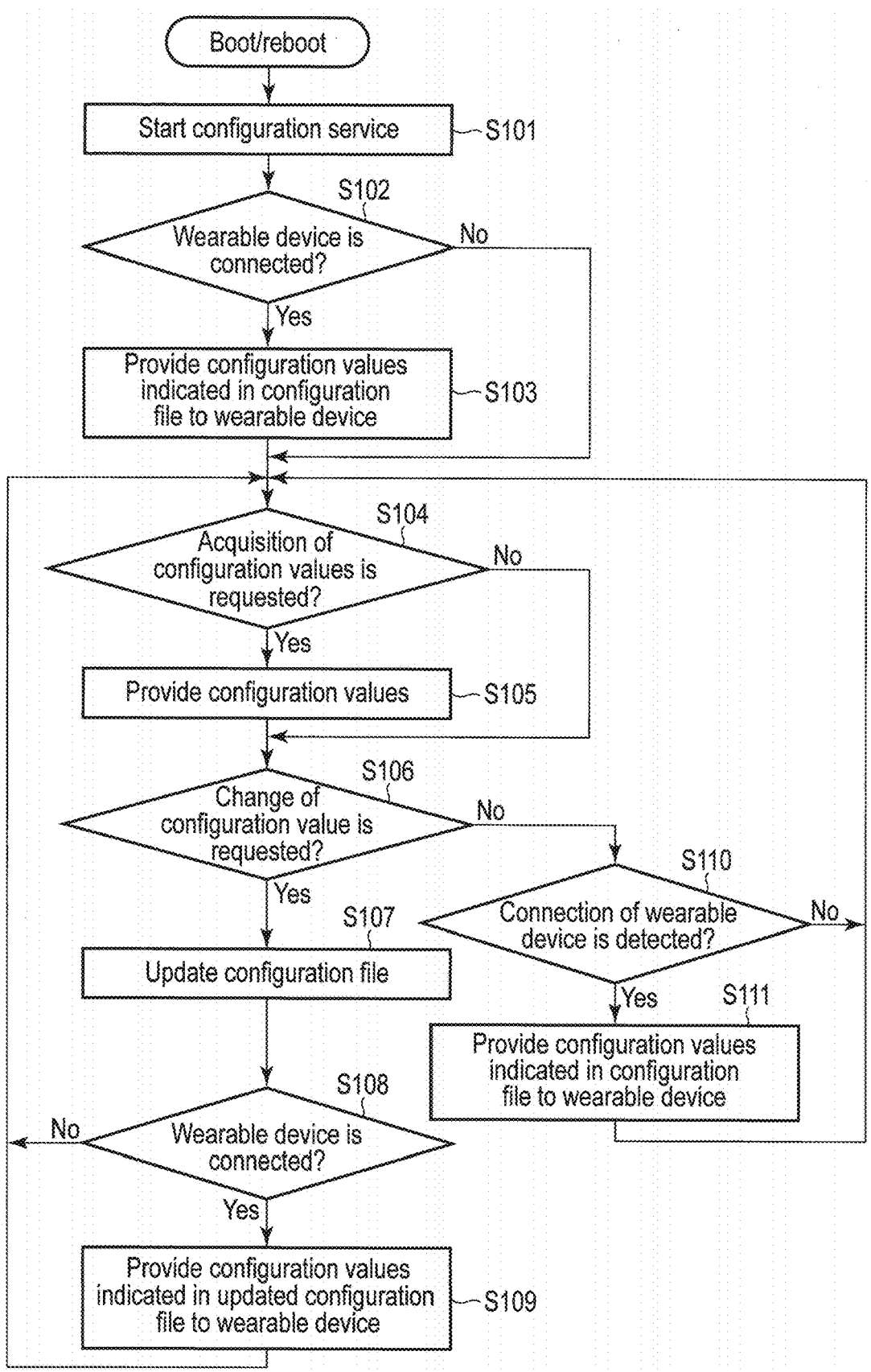
FIG. 12 is a flowchart of the procedure of a configuration process executed by the electronic apparatus of the embodiment.

With reference to the flowchart of FIG. 12, an example of the procedure of a configuration process executed by the mobile PC 2 will be explained. The configuration process is started in response to the boot or reboot of the mobile PC 2.

Upon boot or reboot, the mobile PC 2 starts the configuration service 308B (step S101). The configuration service 308B includes a function to provide the configuration values, which are indicated in the configuration file 45, to the wearable device 3 connected thereto, and a function to process various requests by the first configuration utility 308C, the second configuration utility 308D, and the application program 308E.

Then, the mobile PC 2 determines whether the wearable device 3 is connected to the mobile PC 2 (step S102). When the wearable device 3 is connected to the mobile PC 2 (YES in step S102), the mobile PC 2 provides the configuration values, which are indicated in the configuration file 45, to the wearable device 3 (step S103). Specifically, the mobile PC 2 reads the configuration file 45 stored in the storage device 330 or the like, and sends signals corresponding to the configuration values indicated in the read configuration file 45 to the wearable device 3. The wearable device 3 receives the signals, and changes the configuration values stored in the wearable device 3 in accordance with the received signals.

On the other hand, when the wearable device 3 is not connected to the mobile PC 2 (NO in step S102), step S103 is skipped.

Then, the mobile PC 2 determines whether the acquisition of the configuration values is requested (step S104). For example, the first configuration utility 308C, the second configuration utility 308D, or the application program 308D requests the acquisition of the configuration values at the time of start. When the acquisition of the configuration values is requested (YES in step S104), the mobile PC 2 reads the configuration file 45 in accordance with the request, and provides the configuration values indicated in the read configuration file 45 (step S105). When the configuration file 45 has already been read in step S103, the configuration values therein may be provided.

When the acquisition of the configuration value is not requested (NO in step S104), step S105 is skipped.

Then, the mobile PC 2 determines whether a change of one or more of the configuration values is requested (step S106). For example, the first configuration utility 308C, the second configuration utility 308D, or the application program 308D requests the change of one or more of the configuration values. For example, the change of one or more of the configuration values is requested in response to a user operation on the first configuration utility 308C or the second configuration utility 308D. Alternatively, the change of one or more of the configuration values is requested by the application program 308E. The request includes, for example, information to specify one or more configuration values to be changed (for example, "target" and "parameter" shown in FIG. 9) and one or more values to be newly set as the one or more configuration values.

When the change of one or more of the configuration values is requested (YES in step S106), the mobile PC 2 updates the configuration file 45 in accordance with the request (step S107). Then, the mobile PC 2 determines whether the wearable device 3 is connected to the mobile PC 2 (step S108). When the wearable device 3 is connected to the mobile PC 2 (YES in step S108), the mobile PC 2 provides the configuration values, which are indicated in the updated configuration file 45, to the wearable device 3 (step S109), and the process returns to step S104.

On the other hand, when the wearable device 3 is not connected to the mobile PC 2 (NO in step S108), step S109 is skipped and the process returns to step S104.

Furthermore, when the change of one or more of the configuration values is not requested (NO in step S106), the mobile PC 2 determines whether the mobile PC 2 newly detects that the wearable device 3 is connected thereto (step S110). The mobile PC 2 can detect that the wearable device 3 is newly connected to the mobile PC 2 after the mobile PC 2 determines that the wearable device 3 is not connected in step S102 or step S108, for example. When the connection of the wearable device 3 is newly detected (YES in step S110), the mobile PC 2 provides the configuration values, which are indicated in the configuration file 45, to the wearable device 3 (step S111), and the process returns to step S104. Thus, in response to newly detecting the connection of the wearable device 3, the configuration values can be provided to the wearable device 3 that was not connected to the mobile PC 2 when booting or rebooting of the mobile PC2 or updating the configuration file 45.

On the other hand, when the connection of the wearable device 3 is not detected (NO in step S110), step S111 is skipped and the process returns to step S104.

As above, the process from step S104 to step S111 is repeated during the execution of configuration service 308B.

Through the above process, the mobile PC 2 can manage the configuration file 45, and can provide the configuration values, which are indicated in the configuration file 45, to the wearable device 3 connected to the mobile PC 2. Note that, the above-described configuration process may be started when the mobile PC 2 returns from the sleep or suspend state.

As explained above, in the present embodiment, the configurations of the wearable device 3 can be facilitated. Any one of the wearable devices 3 wearable by a user can be connected to the mobile PC 2 (specifically, USB Type-C receptacle 207). The update control module 41 updates the configuration file 45 for configurations of the wearable devices 3. The configuration control module 43 provides, when the first wearable device 3A of the wearable devices 3 is connected to the mobile PC 2, the configuration values, which are included in the configuration file 45, to the first wearable device 3A. The configuration control module 43 provides, when the second wearable device 3B of the wearable devices 3 is connected to the mobile PC 2, the configuration values to the second wearable device 3B.

Thus, a user can easily use the wearable devices 3A and 3B connected to the mobile PC 2 with the same configurations without performing complicated operations for configurations in each wearable device.

Each of various functions described in the embodiment may be realized by a circuit (e.g., processing circuit). An exemplary processing circuit may be a programmed processor such as a central processing unit (CPU). The processor executes computer programs (instructions) stored in a memory thereby perform the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

Furthermore, various processes of the embodiment can be realized by executing a computer programs. Thus, the same advantages obtained by the embodiment can be achieved by installing the computer program into a computer via a computer readable storage medium storing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a transceiver connectable to any of a plurality of wearable devices wearable by a user; and
a processor that
updates a configuration file that stores one or more configuration values of the plurality of wearable devices,
provides, when the electronic apparatus is booted or rebooted after being turned off while a first wearable device of the plurality of wearable devices is connected to the electronic apparatus, the one or more configuration values to the first wearable device, and
provides, when the electronic apparatus is booted or rebooted after being turned off while a second wearable device of the plurality of wearable devices is connected to the electronic apparatus, the one or more configuration values to the second wearable device.

2. The electronic apparatus of claim 1, wherein the processor provides, when a third wearable device of the plurality of wearable devices is newly connected to the electronic apparatus, the one or more configuration values to the third wearable device.

3. The electronic apparatus of claim 1, wherein the processor provides, in a case where a third wearable device of the plurality of wearable devices is newly connected to the electronic apparatus while the electronic apparatus is in a sleep state or in a suspend state, and when the electronic apparatus is returned from the sleep state or the suspend state, the one or more configuration values to the third wearable device.

4. The electronic apparatus of claim 1, wherein
the processor provides, after the electronic apparatus to which the first wearable device is connected transitions to a suspend state, and when the electronic device is returned from the suspend state, the one or more configuration values to the first wearable device, and
the processor provides, after the electronic apparatus to which the second wearable device is connected transitions to the suspend state, and when the electronic device is returned from the suspend state, the one or more configuration values to the second wearable device.

5. The electronic apparatus of claim 1, wherein
the processor updates, when a request to update the one or more configuration values is received, the configuration file in accordance with the request,
the processor provides, when the configuration file is updated while the first wearable device is connected to the electronic apparatus, one or more configuration values in the updated configuration file to the first wearable device, and
the processor provides, when the configuration file is updated while the second wearable device is connected to the electronic apparatus, one or more configuration values in the updated configuration file to the second wearable device.

6. The electronic apparatus of claim 5, wherein the processor receives the request based on an operation by a user, from a utility program to change the one or more configuration values, that is executed in the electronic apparatus.

7. The electronic apparatus of claim 5, wherein the processor receives the request, from an application program related to an operation of at least one of the first wearable device or the second wearable device, that is executed in the electronic apparatus.

8. The electronic apparatus of claim 1, wherein
the processor updates a plurality of configuration files to respectively manage configurations of the plurality of wearable devices, the plurality of configuration files being associated with a plurality of users respectively,
the processor provides, when a first user of the plurality of users uses the electronic apparatus while the first wearable device is connected to the electronic apparatus, one or more first configuration values in a first configuration file of the plurality of configuration files to the first wearable device, the first configuration file being associated with the first user, and
the processor provides, when the first user uses the electronic apparatus while the second wearable device is connected to the electronic apparatus, the one or more first configuration values to the second wearable device.

9. The electronic apparatus of claim 8, wherein
the processor provides, when a second user of the plurality of users uses the electronic apparatus while the first wearable device is connected to the electronic apparatus, one or more second configuration values in a second configuration file of the plurality of configuration files to the first wearable device, the second configuration file being associated with the second user, and
the processor provides, when the second user uses the electronic apparatus while the second wearable device is connected to the electronic apparatus, the one or more second configuration values to the second wearable device.

10. The electronic apparatus of claim 1, wherein the one or more configuration values are used to control operations of one or more components included in each of the plurality of wearable devices.

11. The electronic apparatus of claim 10, wherein the one or more components comprise a display, a touchpad, a button, a light, a microphone, a speaker, a camera, or a sensor.

12. The electronic apparatus of claim 10, wherein the electronic apparatus is a portable wireless device.

13. A control method of an electronic apparatus connectable to any of a plurality of wearable devices wearable by a user, the control method comprising:
updating a configuration file that stores one or more configuration values of the plurality of wearable devices;
providing, when the electronic apparatus is booted or rebooted after being turned off while a first wearable device of the plurality of wearable devices is connected to the electronic apparatus, the one or more configuration values to the first wearable device; and
providing, when the electronic apparatus is booted or rebooted after being turned off while a second wearable device of the plurality of wearable devices is connected to the electronic apparatus, the one or more configuration values to the second wearable device.

* * * * *